United States Patent
Zhang et al.

(10) Patent No.: US 12,374,159 B2
(45) Date of Patent: Jul. 29, 2025

(54) PUPIL INFORMATION COLLECTION CIRCUIT AND METHOD, AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Lianghao Zhang, Beijing (CN); Wenchao Han, Beijing (CN); Wei Sun, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/022,788

(22) PCT Filed: Mar. 28, 2022

(86) PCT No.: PCT/CN2022/083285
§ 371 (c)(1),
(2) Date: Feb. 23, 2023

(87) PCT Pub. No.: WO2023/184068
PCT Pub. Date: Oct. 5, 2023

(65) Prior Publication Data
US 2024/0273947 A1  Aug. 15, 2024

(51) Int. Cl.
*G06V 40/19* (2022.01)
*G02B 27/00* (2006.01)
*G02B 27/01* (2006.01)

(52) U.S. Cl.
CPC ......... *G06V 40/19* (2022.01); *G02B 27/0093* (2013.01); *G02B 27/017* (2013.01)

(58) Field of Classification Search
CPC  A61B 3/10; A61B 5/11; A61B 5/1103; A61B 5/1126; A61B 5/163; A61B 5/18;
(Continued)

(56) References Cited

U.S. PATENT DOCUMENTS

| | | | |
|---|---|---|---|
| 2010/0149073 A1* | 6/2010 | Chaum | G02B 27/0075 345/8 |
| 2019/0018237 A1* | 1/2019 | Pugh | G02B 27/0093 |
| 2019/0258062 A1* | 8/2019 | Aleem | G02B 27/0172 |

FOREIGN PATENT DOCUMENTS

| | | |
|---|---|---|
| CN | 102693022 A | 9/2012 |
| CN | 105426849 A | 3/2016 |

(Continued)

*Primary Examiner* — Nelson M Rosario
(74) *Attorney, Agent, or Firm* — HOUTTEMAN LAW LLC

(57) ABSTRACT

A pupil information collection circuit, a pupil information collection method and a display apparatus are provided, belong to the field of display technology, and can solve the problem that the existing pupil information collection circuit occupies a large area. The pupil information collection circuit includes: M infrared light sensors, N analog-to-digital converters and N multiplexing sub-circuits; where M and N are both positive integers, and M is greater than N; every m infrared light sensors are connected to the same analog-to-digital converter through one corresponding multiplexing sub-circuit; m is less than or equal to M; and for the m infrared light sensors connected to the same analog-to-digital converter, a distance between collection ranges of any two adjacent infrared light sensors is greater than a diameter of the pupil.

12 Claims, 5 Drawing Sheets

(58) Field of Classification Search
CPC ... A61B 5/4809; A61B 5/6803; A61B 5/6821; A61B 5/6847; A61B 5/7225; A61B 5/746; A61B 2503/20; A61B 2503/22; A61F 2/16; A61F 2/1613; A61F 2002/1699; A61F 2250/008; A61F 2250/0091; A61M 21/00; A61M 2021/0005; A61M 2205/18; A61M 2210/0612; A61M 2230/63; B06B 1/06; G01J 1/44; G02B 1/043; G02B 27/0093; G02C 11/10; G02C 7/04; G02C 7/048; G02C 7/083; G08B 21/06

See application file for complete search history.

(56) References Cited

FOREIGN PATENT DOCUMENTS

| | | | |
|---|---|---|---|
| CN | 205193833 | U | 4/2016 |
| CN | 105676458 | A | 6/2016 |
| CN | 205750115 | U | 11/2016 |
| CN | 207037599 | U | 2/2018 |
| CN | 210321828 | U | 4/2020 |
| CN | 111281403 | A | 6/2020 |
| CN | 113504833 | A | 10/2021 |
| DE | 10322860 | A1 | 12/2004 |

* cited by examiner

PUPIL INFORMATION COLLECTION CIRCUIT AND METHOD, AND DISPLAY APPARATUS

TECHNICAL FIELD

The present disclosure relates to the field of display technology, in particular to a pupil information collection circuit, a pupil information collection method and a display apparatus.

BACKGROUND

In recent years, the virtual reality (VR)/augmented reality (AR) technology has been gradually applied to the fields of displays, games, medical treatments, and the like. With the development of the technology, people have higher and higher expectations and requirements for the VR/AR technology, and an interaction between a user and a VR/AR device is not limited to traditional human-computer interaction such as touch control and gestures. In this way, an eye tracking technology gradually becomes an important technology for improving user experiences using the VR/AR device. The eye tracking technology is an intelligent human-computer interaction technology for controlling the VR/AR device by means of eye movements, all operations can be performed by "seeing" with eyes. Thus, the technology is hands-free and fastest and most humanized human-computer interaction technology.

Currently, the eye tracking technology is mainly implemented by a camera and the like, but has a low signal transmission speed, and is easily subjected to a response delay. In order to overcome the problem of the response delay in the human-computer interaction, it has gradually become a trend to use an infrared photodiode to collect pupil information of a user to track an eye. However, a great number of infrared photodiodes are provided in the current VR/AR device, and each infrared photodiode is provided with one analog-to-digital converter to scan the user's pupil. Therefore, it needs a large area in the VR/AR device to integrate the analog-to-digital converters, which results in an increased energy consumption. In addition, it is necessary to provide a great number of data lines for signal transmission, a large area is further to be occupied, and a large amount of redundant data is caused, thereby increasing a burden of data processing of the analog-to-digital converters, and affecting the efficiency of signal transmission.

SUMMARY

The present disclosure is directed to at least one of technical problems in the related art, and provides a pupil information collection circuit, a pupil information collection method and a display apparatus.

In a first aspect, an embodiment of the present disclosure provides a pupil information collection circuit, including: M infrared light sensors, N analog-to-digital converters and N multiplexing sub-circuits; where M and N are both positive integers, and M is greater than N; every m infrared light sensors are connected to the same analog-to-digital converter through one corresponding multiplexing sub-circuit; where m is less than or equal to M; and for the m infrared light sensors connected to the same analog-to-digital converter, a distance between collection ranges of any two adjacent infrared light sensors is greater than a diameter of the pupil.

In some implementations, each multiplexing sub-circuit includes: shift registers and a data selector; each shift register is connected to a control signal terminal and the data selector, and is configured to store a control signal for the corresponding analog-to-digital converter; and the data selector is configured to control, based on the control signal, the m infrared light sensors connected to the same analog-to-digital converter to collect the pupil information according to a preset rule.

In some implementations, the data selector includes: an encoder, and one first information channel and m second information channels connected to the encoder; the first information channel includes: a first transistor and a second transistor; a control electrode of the first transistor is connected to a signal output terminal of the encoder, a first electrode of the first transistor is connected to a first clock signal terminal, and a second electrode of the first transistor is connected to a control electrode of the second transistor; the control electrode of the second transistor is connected to the second electrode of the first transistor, a first electrode of the second transistor is connected to the analog-to-digital converter, and a second electrode of the second transistor is connected to the m infrared light sensors; and each second information channel includes: a third transistor and a fourth transistor; a control electrode of the third transistor is connected to a signal output terminal of the encoder, a first electrode of the third transistor is connected to a second clock signal terminal, and a second electrode of the third transistor is connected to a control electrode of the fourth transistor; the control electrode of the fourth transistor is connected to the second electrode of the third transistor, a first electrode of the fourth transistor is connected to the analog-to-digital converter, and a second electrode of the fourth transistor is connected to one corresponding infrared light sensor.

In some implementations, each multiplexing sub-circuit further includes: m−1 data delayers; and each data delayer is configured to sequentially input scanning signals to the corresponding m infrared light sensors according to a preset rule.

In some implementations, each data delayer includes: a fifth transistor, a sixth transistor, a seventh transistor, a first capacitor, a second capacitor and a resistor; a polarity of the fifth transistor is opposite to that of the sixth transistor, and is the same as that of the seventh transistor; a control electrode of the fifth transistor is connected to the second clock signal terminal, a first electrode of the fifth transistor is connected to the second electrode of the corresponding fourth transistor, and a second electrode of the fifth transistor is connected to a terminal of the first capacitor; another terminal of the first capacitor is connected to a first electrode of the sixth transistor; a control electrode of the sixth transistor is connected to the second clock signal terminal, a second electrode of the sixth transistor is connected to a terminal of the second capacitor and a first electrode of the seventh transistor; another terminal of the second capacitor is grounded; a control electrode of the seventh transistor is connected to the second clock signal terminal, the first electrode of the seventh transistor is connected to the second electrode of the sixth transistor, and a second electrode of the seventh transistor is connected to a terminal of the resistor and one corresponding infrared light sensor; and another terminal of the resistor is grounded.

In some implementations, the data selector includes: an encoder, and m second information channels connected to the encoder; and each second information channel includes: a third transistor and a fourth transistor; a control electrode of the third transistor is connected to a signal output terminal of the encoder, a first electrode of the third transistor is connected to a second clock signal terminal, and a second electrode of the third transistor is connected to a control electrode of the fourth transistor; the control electrode of the fourth transistor is connected to the second electrode of the third transistor, a first electrode of the fourth transistor is connected to the analog-to-digital converter, and a second electrode of the fourth transistor is connected to one corresponding infrared light sensor.

In some implementations, each infrared light sensor includes: an infrared photodiode.

In some implementations, each analog-to-digital converter is a one-bit analog-to-digital converter.

In a second aspect, an embodiment of the present disclosure provides a display apparatus, including the pupil information collection circuit described above.

In some implementations, the display apparatus further includes: a display panel; the display panel includes a central display region and a peripheral display region surrounding the central display region; and the pupil information collection circuit is in the central display region or the peripheral display region.

In some implementations, the display apparatus is a virtual reality display apparatus or an augmented reality display apparatus.

In a third aspect, an embodiment of the present disclosure provides a pupil information collection method, applied to the pupil information collection circuit described above, the method including: storing a control signal in each shift register according to a preset rule; and controlling, based on the control signal, m infrared light sensors connected to the same analog-to-digital converter to collect pupil information according to the preset rule.

In some implementations, the controlling, based on the control signal, the m infrared light sensors connected to the same analog-to-digital converter to collect the pupil information according to the preset rule, includes: sequentially scanning the m infrared light sensors based on the control signal; and in response to one of the m infrared light sensors collects the pupil information, turning off the rest m−1 infrared light sensors, and collecting the pupil information by using the one infrared light sensor only.

DETAIL DESCRIPTION OF EMBODIMENTS

In order to enable one of ordinary skill in the art to better understand the technical solutions of the present disclosure, the present disclosure will be described in further detail with reference to the accompanying drawings and implementations.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper/on", "lower/below", "left", "right", and the like are used only for indicating relative positional relationships, and when the absolute position of an object being described is changed, the relative positional relationships may be changed accordingly.

Figure 1:
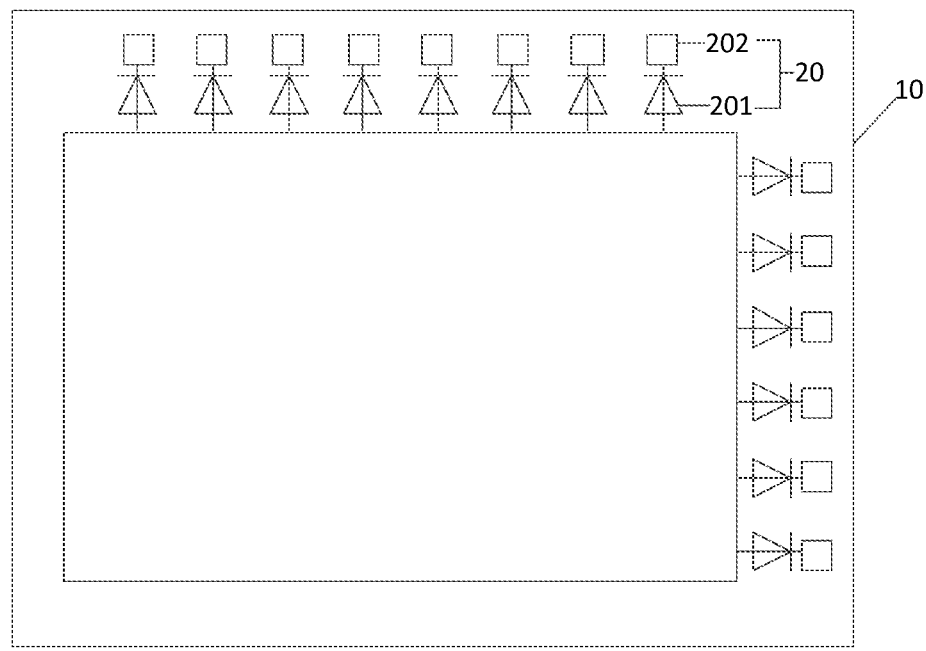
FIG. 1 is a schematic diagram of a structure of an exemplary display apparatus.

FIG. 1 is a schematic diagram of a structure of an exemplary display apparatus. As shown in FIG. 1, the display apparatus includes: a display panel 10; the display panel 10 has a central display region and a peripheral display region surrounding the central display region; the display panel 10 is provided with a pupil information collection circuit 20. The pupil information collection circuit 20 may be provided in the central display region, so that a great number of pupil information collection circuits 20 are provided, to improve an accuracy of collecting pupil information. The pupil information collection circuit 20 may also be disposed in the peripheral display region, and the light containing the pupil information is reflected by an optical structure and is irradiated on the peripheral display region. In the following description, as an example, the pupil information collection circuit 20 is disposed in the peripheral display region (as shown in FIG. 1) for description.

As shown in FIG. 1, the pupil information collection circuit 20 includes: a plurality of infrared light sensors 201 and a plurality of analog-to-digital converters 202; the infrared light sensors 201 are connected to the analog-to-digital converters 202 in a one-to-one correspondence.

In the pupil information collection circuit 20, the infrared light sensors 201 are connected to the analog-to-digital converters 202 in a one-to-one correspondence, and a distance between the infrared light sensor and the analog-to-digital converter corresponding to each other is relatively small, so that the infrared light sensor and the analog-to-digital converter corresponding to each other are provided closely to each other, so as to prevent a too large distance between the infrared light sensor and the analog-to-digital converter corresponding to each other from influencing an effect of signal transmission. In operation, when a user observes the display panel in the display apparatus, the infrared light sensors 201 can collect the pupil information of the user and convert optical signals into analog voltage signals, which may be converted into digital signals by the corresponding analog-to-digital converters 202. For example, when the infrared light sensors 201 have collected the pupil information of the user, the corresponding analog-to-digital converters 202 may output "1"; and when the infrared light sensors 202 have not collected the pupil information of the user, the corresponding analog-to-digital converters 202 may output "0", so that positions of pupils of the user can be determined, and thus, the human-computer interaction is achieved by using the pupil tracking technology.

However, in the current display apparatus, in order to improve the accuracy of collecting the pupil information, a great number of the infrared light sensors 201 are disposed in the display panel 10, and each infrared light sensor 201 is provided with one analog-to-digital converter 202 to scan the user's pupil. Therefore, a large area in the display apparatus is desired for integrating the analog-to-digital converters 202, resulting in an increased energy consumption. In addition, a great number of data lines are desired to be provided for signal transmission, a large area is further to be occupied, and a large amount of redundant data is caused, thereby increasing a burden of data processing of the analog-to-digital converters 202, affecting the efficiency of signal transmission and lowering user experiences.

In order to solve at least one of above technical problems, embodiments of the present disclosure provide a pupil information collection circuit, a pupil information collection method and a display apparatus, which will be described in detail below with reference to the accompanying drawings and implementations.

It should be noted that transistors used in the embodiments of the present disclosure may be thin film transistors or field effect transistors or other devices with similar characteristics. A source electrode and a drain electrode of each transistor used are symmetrical, and thus there is no difference between the source electrode and the drain electrode of each transistor. In the embodiments of the present disclosure, to distinguish the source electrode and the drain electrode of each transistor, one of the source electrode and the drain electrode is referred to as a first electrode, the other one is referred to as a second electrode, and a gate electrode of each transistor is referred to as a control electrode. In addition, the transistors can be divided into N type transistors and P type transistors according to the characteristics of the transistors. When the N type transistors are adopted, the first electrode is the source electrode of each N type transistor, the second electrode is the drain electrode of each N type transistor, and when a signal at a high level is input to the gate electrode, the source electrode and the drain electrode are conducted, and the opposite is the case of the P type transistors. It is contemplated that the implementation by using the P type transistors will be readily apparent to one skilled in the art without any inventive effort and, thus, is within the scope of the embodiment of the present disclosure.

Figure 2:
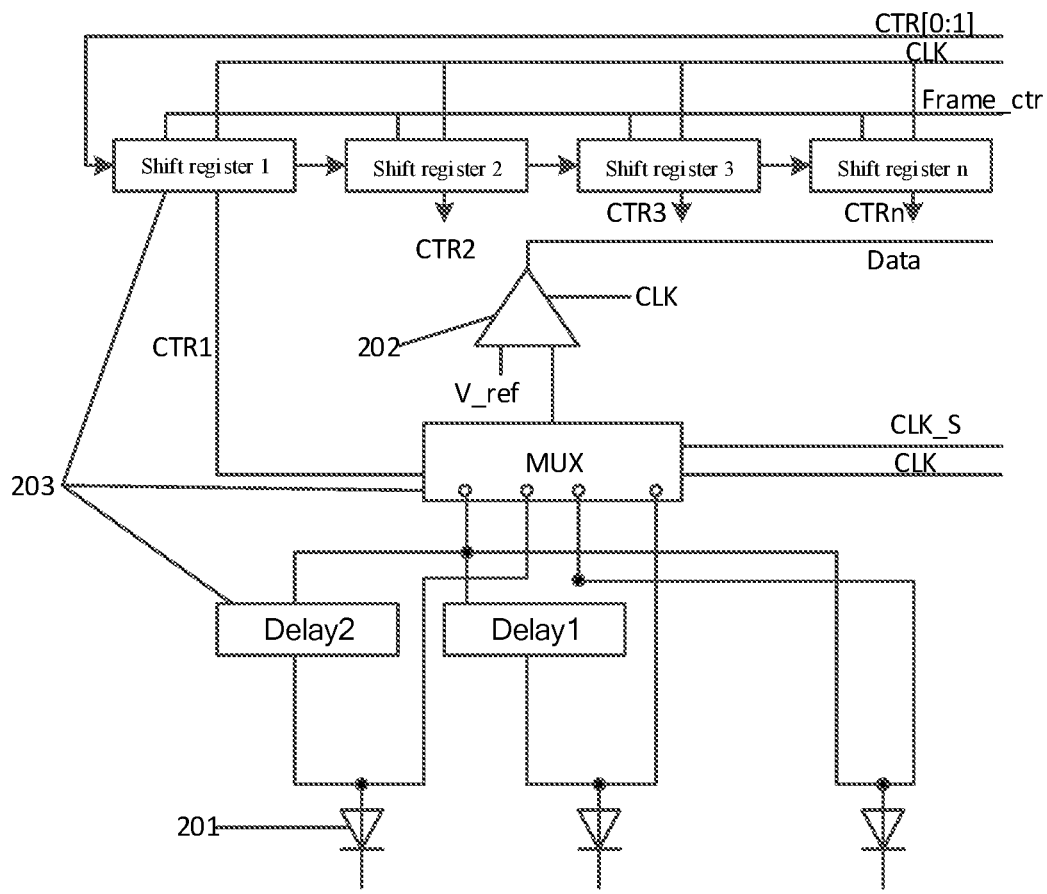
FIG. 2 is a schematic diagram of a structure of a pupil information collection circuit according to an embodiment of the present disclosure.

In a first aspect, an embodiment of the present disclosure provides a pupil information collection circuit. FIG. 2 is a schematic diagram of a structure of a pupil information collection circuit according to an embodiment of the present disclosure. As shown in FIG. 2, the pupil information collection circuit 20 includes: M infrared light sensors 201, N analog-to-digital converters 202 and N multiplexing sub-circuits 203; M and N are both positive integers, and M is greater than N; every m infrared light sensors 201 are connected to the same analog-to-digital converter 202 through one corresponding multiplexing sub-circuit 203; m is less than or equal to M; and for the m infrared light sensors 201 connected to the same analog-to-digital converter 202, a distance between collection ranges of any two adjacent infrared light sensors 201 is greater than a diameter of the pupil.

It should be noted that, in the embodiment of the present disclosure and the following description, as an example, m is equal to 3, that is, a case where every three infrared light sensors 201 multiplex the same analog-to-digital converter 202 is taken as an example for description. It can be understood that m may also be equal to 4, 6, 8, or any other value, which may be selected as desired, but m cannot be too large in order to ensure an efficiency of data processing of each analog-to-digital converter 202.

In the pupil information collection circuit 20 provided in the embodiment of the present disclosure, the number of the infrared light sensors 201 is much larger than the number of the analog-to-digital converters 202, every m infrared light sensors multiplex the same analog-to-digital converter 202 through one corresponding multiplexing sub-circuit 203. The corresponding multiplexing sub-circuit 203 controls the signal transmission between the m infrared light sensors and the same analog-to-digital converter 202 to implement multiplexing of a signal channel, so that the number of the analog-to-digital converters 202 in the pupil information collection circuit 20 can be reduced, and the area occupied by the analog-to-digital converters 202 can be reduced.

Meanwhile, the number of data signal lines connected between the infrared light sensors 201 and the analog-to-digital converters 202 can be reduced, and the redundant data is avoided, so that the burden of data processing of the analog-to-digital converters 202 is reduced, the efficiency of collecting the pupil information is improved, and the user experiences are improved.

In addition, for the m infrared light sensors 201 connected to the same analog-to-digital converter 202, the distance between the collection ranges of any two adjacent infrared light sensors 201 is greater than the diameter of the pupil, so that only one infrared light sensor 201 can collect the pupil information of the user at any time, the corresponding multiplexing sub-circuit 203 can control the signal transmission between the infrared light sensor 201 and the corresponding analog-to-digital converter 202, and other infrared light sensors 201 are in an off state. In this way, a centralized collection for the pupil information can be realized, and the energy consumption for collecting the pupil information can be reduced while the efficiency for collecting the pupil information is ensured.

In some implementations, as shown in FIG. 2, each multiplexing sub-circuit 203 includes: shift registers and a data selector MUX; each shift register is connected to a control signal terminal and the data selector MUX, and is configured to store a control signal for the corresponding analog-to-digital converter 202; the data selector MUX is configured to control, based on the control signal, the m infrared light sensors 201 connected to the same analog-to-digital converter 202 to collect the pupil information according to a preset rule.

Since a plurality of infrared light sensors 201 are connected to the same analog-to-digital converter 202, in order to ensure that the control signal is input to the corresponding infrared light sensors 201 timely, effectively and orderly, each shift register can store the control signal, and transmit the corresponding control signal to the corresponding infrared light sensors 201 when the infrared light sensors 201 are to be scanned. The data selector MUX can control the m infrared light sensors 201 connected to the same analog-to-digital converter 202 to collect the pupil information according to the preset rule. In this way, it can be ensured that each analog-to-digital converter 202 only processes the pupil information collected by one corresponding infrared light sensor 201 at any time, so that the burden of data processing of the analog-to-digital converter 202 can be reduced, the efficiency of collecting the pupil information is improved, and the user experiences are improved. It should be noted that each shift register is in correspondence with one analog-to-digital converters 202, only one analog-to-digital converter 202 is shown in the embodiment of the present disclosure, and a connection relationship between each of other shift registers and the corresponding analog-to-digital converter 202 is the same as that described above. For example, the shift register 2 shown in FIG. 2 is also connected to one corresponding analog-to-digital converter 202, and the implementation principle thereof is the same as that described above, and is not described again.

Figure 3:
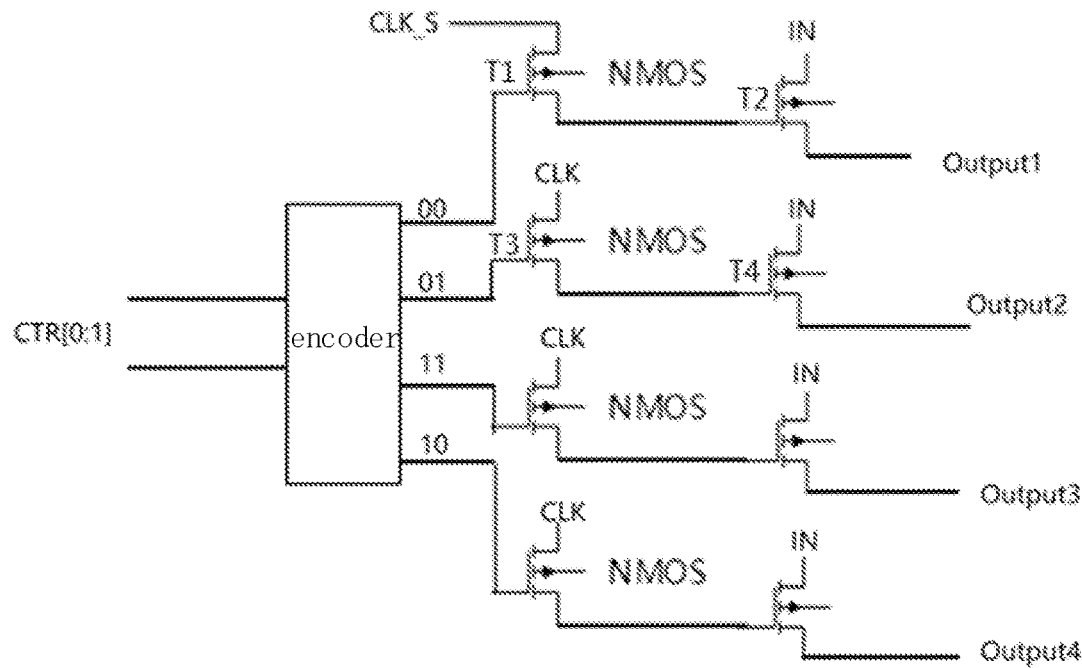
FIG. 3 is a schematic diagram of a structure of a data selector according to an embodiment of the present disclosure.

Specifically, FIG. 3 is a schematic diagram of a structure of a data selector according to an embodiment of the present disclosure. As shown in FIG. 3, the data selector MUX includes: an encoder, and one first information channel and m second information channels connected to the encoder; the first information channel includes: a first transistor T1 and a second transistor T2; a gate electrode of the first transistor T1 is connected to a signal output terminal of the encoder, a source electrode of the first transistor T1 is connected to a first clock signal terminal CLK_S, and a drain electrode of the first transistor T1 is connected to a gate electrode of the second transistor T2; the gate electrode of the second transistor T2 is connected to the drain electrode of the first transistor T1, a source electrode of the second transistor T2 is connected to the analog-to-digital converter 202 (not shown in FIG. 3, only a signal input terminal IN is shown), and a drain electrode of the second transistor T2 is connected to the m infrared light sensors 201 (not shown in FIG. 3, only a signal output terminal Output1 is shown). Each second information channel includes: a third transistor T3 and a fourth transistor T4; a gate electrode of the third transistor T3 is connected to a signal output terminal of the encoder, a source electrode of the third transistor T3 is connected to a second clock signal terminal CLK, and a drain electrode of the third transistor T3 is connected to a gate electrode of the fourth transistor T4; the gate electrode of the fourth transistor T4 is connected to the drain electrode of the third transistor T3, a source electrode of the fourth transistor T4 is connected to the analog-to-digital converter 202 (not shown in FIG. 3, only a signal input terminal IN is shown), and a drain electrode of the fourth transistor T4 is connected to one corresponding infrared light sensor 201 (not shown in FIG. 3, only signal output terminals Output2, Output3, Output4 are shown).

In the embodiment of the present disclosure, the number of the infrared light sensors 201 connected to the same data selector MUX is 3, and the number of the signal output terminals of the encoder in the data selector MUX is 4. The signal output terminals may output four signals, that is, "00", "01", "11", and "10", which respectively represent "scan three infrared light sensors one by one", "scan only the first infrared light sensor", "scan only the second infrared light sensor", and "scan only the third infrared light sensor". The signal channel may be divided into two types, that is, the first type is a first signal channel that scans the infrared light sensors one by one, and the second type is a second signal channel that scans only one of the infrared light sensors. By adjusting the control signal, one of the infrared light sensors 201 may collect the pupil information, and the other infrared light sensors are in the off state. In this way, the centralized collection for the pupil information can be realized, and the energy consumption for collecting the pupil information can be reduced while the efficiency for collecting the pupil information is ensured. Meanwhile, the number of the analog-to-digital converters 202 in the pupil information collection circuit 20 can be reduced, and the area occupied by the analog-to-digital converters 202 can be reduced.

In some implementations, as shown in FIG. 2, each multiplexing sub-circuit further includes: m−1 data delayers Delay (labeled as Delay1, Delay2, . . . , respectively); the data delayers Delay are configured to sequentially input scan signals to the corresponding m infrared light sensors 201 according to a preset rule.

Figure 4:
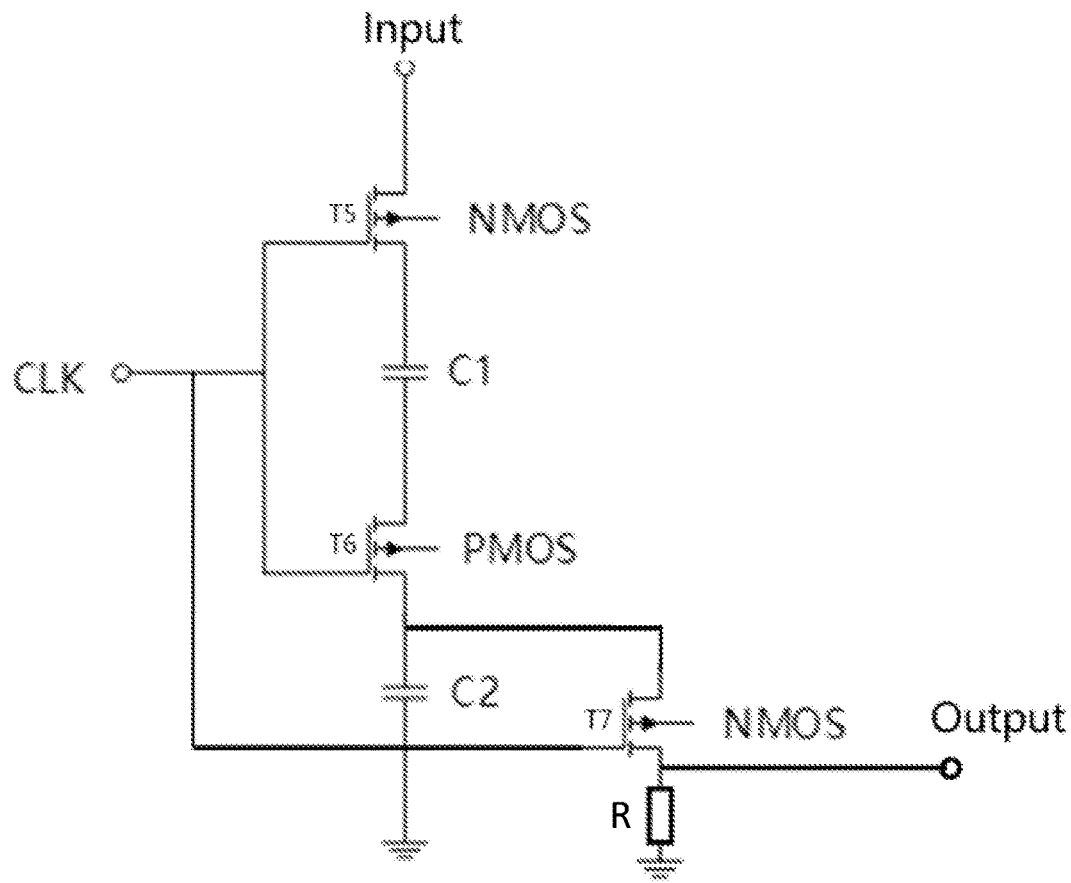
FIG. 4 is a schematic diagram of a structure of a data delayer according to an embodiment of the present disclosure.

Specifically, FIG. 4 is a schematic diagram of a structure of a data delayer according to an embodiment of the present disclosure. As shown in FIG. 4, the data delayer Delay includes: a fifth transistor T5, a sixth transistor T6, a seventh transistor T7, a first capacitor C1, a second capacitor C2, and a resistor R; a polarity of the fifth transistor T5 is opposite to that of the sixth transistor T6, and is the same as that of the seventh transistor T7; a gate electrode of the fifth transistor T5 is connected to the second clock signal terminal CLK, a source electrode of the fifth transistor T5 is connected to the drain electrode of the corresponding fourth transistor T4, and a drain electrode of the fifth transistor T5 is connected to a terminal of the first capacitor C1; another terminal of the first capacitor C1 is connected to a source electrode of the sixth transistor T6; a gate electrode of the sixth transistor T6 is connected to the second clock signal terminal CLK, a drain electrode of the sixth transistor T6 is connected to a terminal of the second capacitor C2 and a source electrode of the seventh transistor T7; another terminal of the second capacitor C2 is grounded; a gate electrode of the seventh transistor T7 is connected to the second clock signal terminal CLK, the source electrode of the seventh transistor T7 is connected to the drain electrode of the sixth transistor T6, and a drain electrode of the seventh transistor T7 is connected to a terminal of the resistor R and the one corresponding infrared light sensor 201 (not shown in FIG. 6, only the signal output terminal Output is shown); and another terminal of the resistor R is grounded.

Each data delayer Delay may delay the control signals input by the second clock signal terminal CLK, so that the control signals input to the corresponding infrared light sensors 201 do not interfere with each other, and only one of the three infrared light sensors 201 multiplexing the same analog-to-digital converter 202 collects the pupil information at any time. In this way, the centralized collection for the pupil information can be realized, and the energy consumption for collecting the pupil information can be reduced while the efficiency for collecting the pupil information is ensured. Meanwhile, the number of the analog-to-digital converters 202 in the pupil information collection circuit 20 can be reduced, and the area occupied by the analog-to-digital converters 202 can be reduced.

Figure 5:
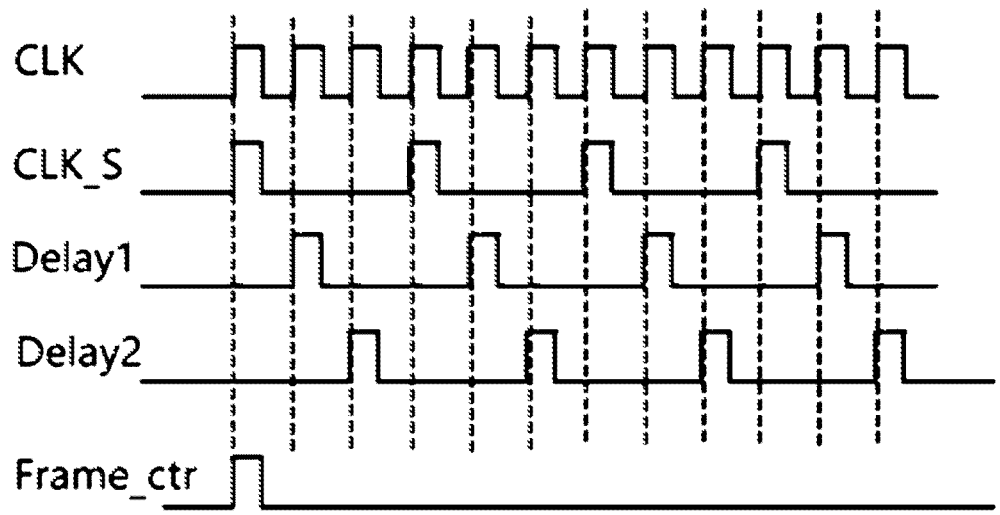
FIG. 5 is a timing diagram of signals in a pupil information collection circuit according to an embodiment of the present disclosure.

FIG. 5 is a timing diagram of signals in a pupil information collection circuit according to an embodiment of the present disclosure. The operating process of the pupil information collection circuit provided in the embodiment of the present disclosure will be further described in detail with reference to the timing diagram of the signals shown in FIG. 5.

Firstly, CTR[0:1] represent the control signal, the control signal for each analog-to-digital converter 202 is stored in the corresponding shift register. Then, a control signal is input to the control signal terminal Frame_ctr to control the shift register to release (transmit) data in the control signal to the data selector MUX, so as to control the data selector MUX. The data selector MUX receives the data in the control signal, and firstly forms control signals through the encoder, where the control signals "00", "01", "11", and "10" respectively indicate to "scan three infrared light sensors one by one", "scan only the first infrared light sensor", "scan only the second infrared light sensor", and "scan only the third infrared light sensor". When the control signal is 00, an output of the encoder corresponding to the "00" is a high level signal, the corresponding first transistor (NMOS) T1 is turned on, and the first clock signal terminal CLK_S may be an output of the data selector MUX, and other cases can be deduced. IN is a sampling terminal of the analog-to-digital converter 202, Output1 is a scan output terminal, and the analog-to-digital converter 202 always performs a scan sampling according to the signal from the second clock signal terminal CLK, which is not to be changed. Control signals with a time sequence as shown in FIG. 5 are obtained through the first clock signal terminal CLK_S and the subsequent two data delayers Delay, so that the analog-to-digital converter 202 can perform scan sampling to sample the pupil information of the three infrared light sensors 201 according to a preset rule. A structure of the data delayer Delay1 in FIG. 2 is shown in FIG. 4, and the signal Delay1 in FIG. 5 can be obtained, the data delayer Delay2 may be implemented by cascading two data delayers Delay1. In other case, the data delayer Delay2 may be implemented by cascading more data delayers Delay1. When the control signal is 01, similarly, the terminal Output2 is communicated with the sampling terminal of the analog-to-digital converter 202, and the analog-to-digital converter 202 can sample the pupil information of the first infrared light sensor 201 alone. The cases when the control signals are 10 and 11 can be deduced.

The pupil information collected by the infrared light sensor 201 may be an optical signal, which may be converted by the infrared light sensor 201 into an analog voltage signal. The analog voltage signal is transmitted to the analog-to-digital converter 202, and is compared with a voltage signal at a reference voltage terminal V_ref; if the collected voltage signal and the voltage signal at the reference voltage terminal V_ref satisfy a preset condition, for example, if a potential of the collected voltage signal is higher than that of the voltage signal at the reference voltage terminal V_ref, a digital signal "1" is output through a data signal output terminal Data, which indicates that the pupil is located at the position where the corresponding infrared light sensor 201 is located. Then, the position of the pupil is determined through analysis by a data analysis module (not shown in the figure), thereby implementing the function of eye tracking.

The operating process of the pupil information collection circuit provided in the embodiment of the present disclosure is that the signal CTR in an initial state is 00, all analog-to-digital converters 202 perform the scanning sampling; when any one analog-to-digital converter 202 collects a value of 0, a system terminal provides control signals CTR according to a position where the value of 0 is collected, and provides the control signals to the shift registers in the next frame, which spends the time for n CLKs. The sampling mode of each analog-to-digital converter 202 in each frame depends on the signal CTR, and the sampling mode is switched once per frame, so that the scanning mode of the analog-to-digital converter 202 can be switched in a very short time, thereby realizing a free control of all the analog-to-digital converters 202 through two lines, and realizing centralized scanning. In addition, useless regions are abandoned and only useful regions are scanned, so that the area occupied by the analog-to-digital converters 202 is greatly saved and the efficiency of collecting the pupil information is ensured.

Figure 6:
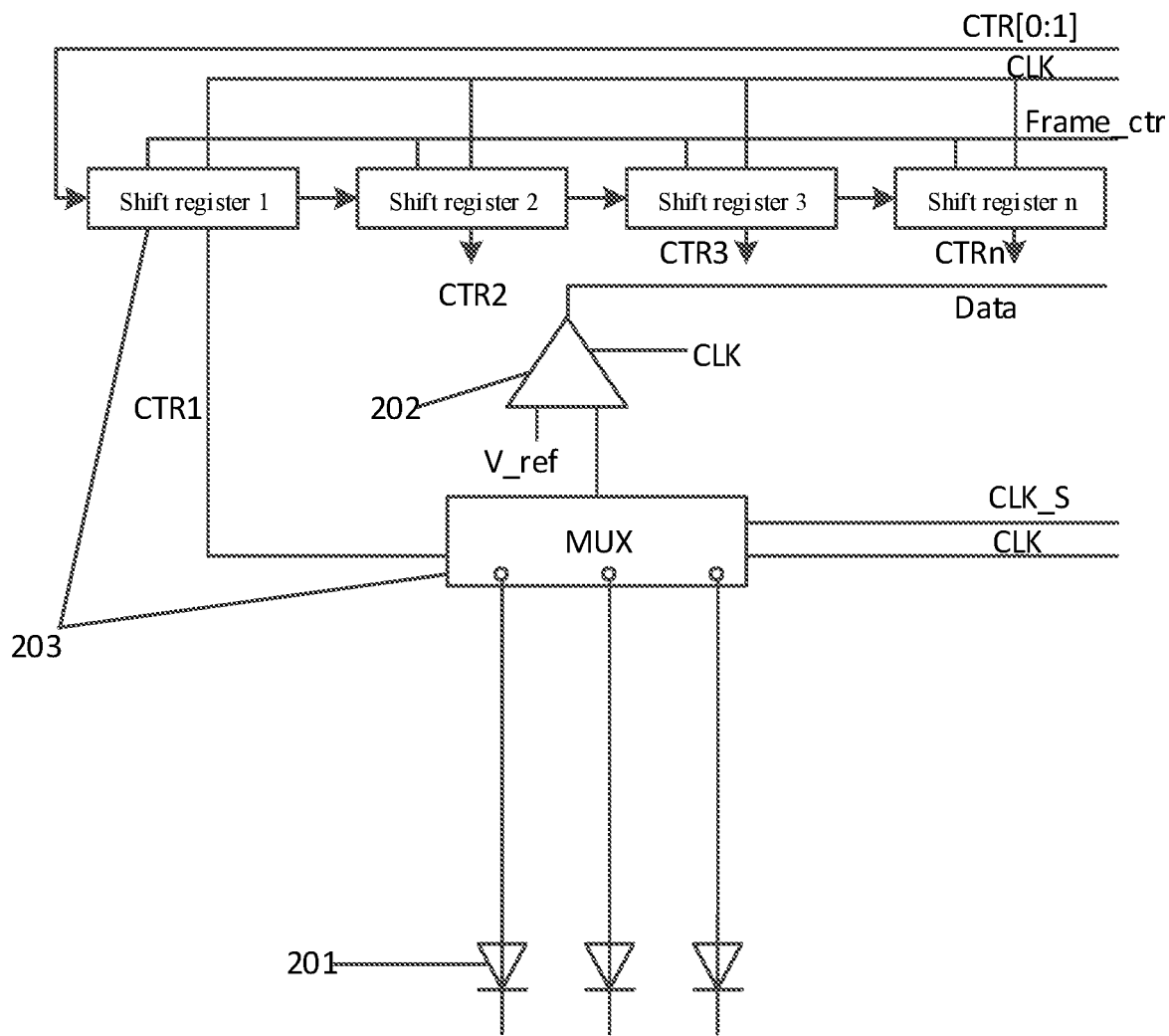
FIG. 6 is a schematic diagram of another structure of a pupil information collection circuit according to an embodiment of the present disclosure.
Figure 7:
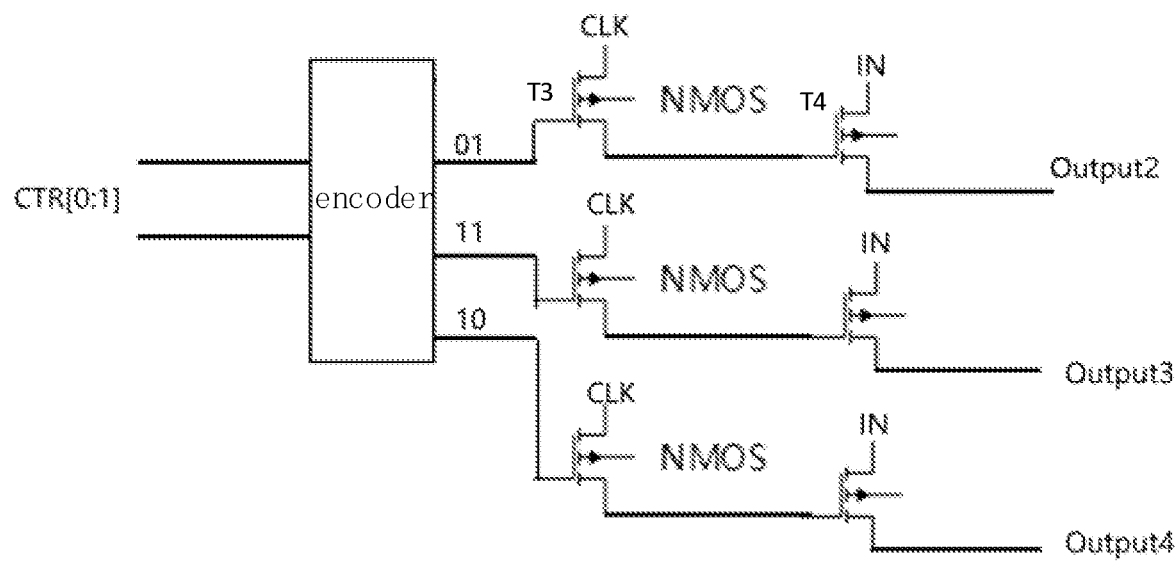
FIG. 7 is a schematic diagram of another structure of a data selector according to an embodiment of the present disclosure.

FIG. 6 is a schematic diagram of another structure of a pupil information collection circuit according to an embodiment of the present disclosure; FIG. 7 is a schematic diagram of another structure of a data selector according to an embodiment of the present disclosure. As shown in FIGS. 6 and 7, the data selector MUX includes: an encoder and m second information channels connected to the encoder; each second information channel includes: a third transistor T3 and a fourth transistor T4; a control electrode of the third transistor T3 is connected to a signal output terminal of the encoder, a first electrode of the third transistor T3 is connected to a second clock signal terminal CLK, and a second electrode of the third transistor T3 is connected to a control electrode of the fourth transistor T4; the control electrode of the fourth transistor T4 is connected to the second electrode of the third transistor T3, a first electrode of the fourth transistor T4 is connected to the analog-to-digital converter 202 (not shown in FIG. 7, only a signal input terminal IN is shown), and a second electrode of the fourth transistor T4 is connected to one corresponding infrared light sensor 201 (not shown in FIG. 7, only signal output terminals Output2, Output3, Output4 are shown).

In the pupil information collection circuit shown in FIG. 6, CTR is still a 2-bit control signal. Unlike the pupil information collection circuit shown in FIG. 2, in the pupil information collection circuit shown in FIG. 6, the data selector MUX has only three signal output terminals, and does not provide the signal output terminal for scanning and detecting three infrared light sensors 201 (the state is shown in FIG. 3 where CTR is 00), the control signal CTR is to be transmitted in real time to ensure that the three infrared light sensors 201 are scanned one by one. When the CTR is 01, a first infrared light sensor 201 is detected; when the CTR is 10, a second infrared light sensor 201 is detected; and when the CTR is 11, a third infrared light sensor 201 is detected; in the process of scanning and detecting, the CTR is continuously switched among such three states (that is, 01, 10 and 11). When any one infrared light sensor 201 is detected and reports 1 (i.e., a value of 1 is output by the corresponding analog-to-digital converter 202), the CTR is kept in a state corresponding to the scanning of the infrared light sensor 201 until a detected signal appears a value of 0, and then the scanning state is recovered. In such way, the pupil information collection circuit is simple in structure, the number of data signal lines can be further reduced, the generation of redundant signals is reduced, the wiring difficulty can be reduced, and the process cost is saved.

In some implementations, each infrared light sensor 201 includes: an infrared photodiode.

The infrared photodiode has a simple structure, and can quickly collect the pupil information, so that the efficiency of collecting the pupil information can be improved.

In some implementations, each analog-to-digital converter 202 is a one-bit analog-to-digital converter.

A memory of the analog-to-digital converter 202 is only 1 bit, whether the pupil is in the corresponding region may be represented by outputting a value of 0 or 1, which may be implemented by only one comparator, so that the circuit structure is simple, and the area occupied by the analog-to-digital converters 202 can be reduced.

Figure 8:
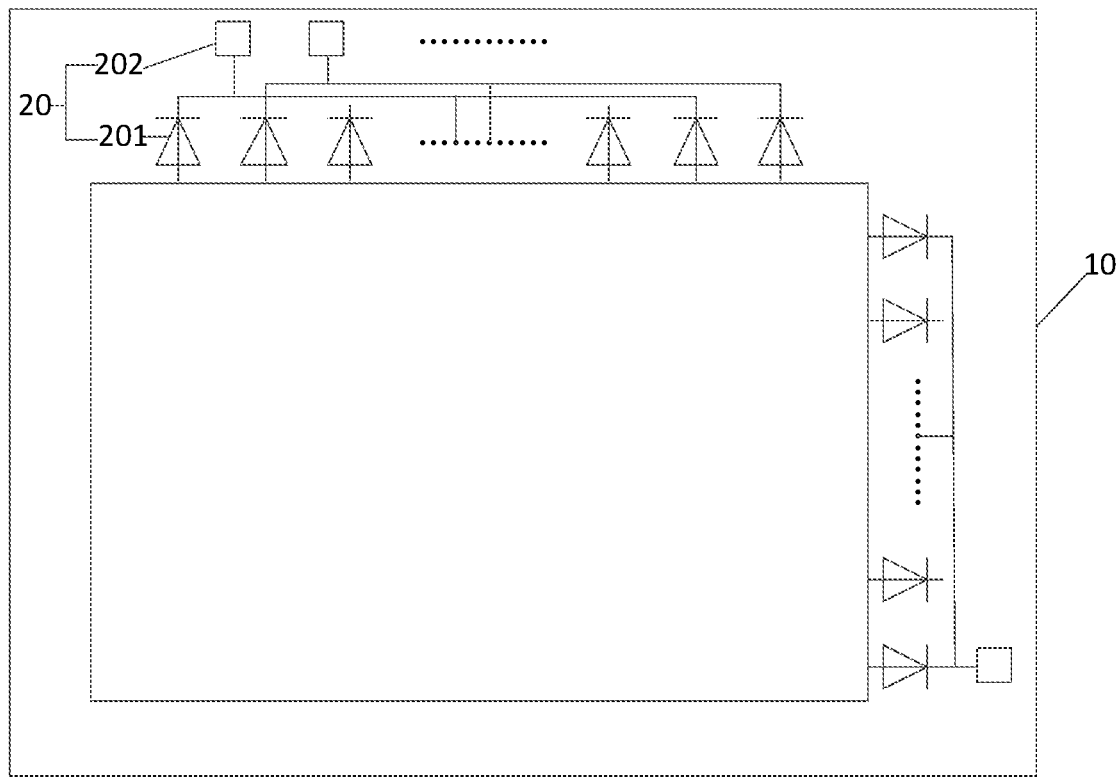
FIG. 8 is a schematic diagram of a structure of a display apparatus according to an embodiment of the present disclosure.

In a second aspect, an embodiment of the present disclosure provides a display apparatus, which includes the pupil information collection circuit as provided in any one of the above embodiments. FIG. 8 is a schematic diagram of a structure of a display apparatus according to an embodiment of the present disclosure. As shown in FIG. 8, the display apparatus further includes: a display panel 10; the display panel 10 has a central display region and a peripheral display region surrounding the central display region. The pupil information collection circuit 20 (the specific structure of which is shown in FIG. 2 and FIG. 6) may be provided in the central display region, so that a great number of pupil information collection circuits are provided, to improve the accuracy of collecting pupil information. The pupil information collection circuit 20 may also be disposed in the peripheral display region, and the light containing the pupil information is reflected by an optical structure and is irradiated on the peripheral display region. FIG. 8 shows only a case where the pupil information collection circuit 20 is provided in the peripheral display region. Specifically, the display apparatus provided by the embodiment of the present disclosure may be a virtual reality display technology or an augmented reality display apparatus. The implementation principle and the beneficial effect of the display apparatus provided by the embodiments of the present disclosure are the same as those of the pupil information collection circuit provided in any one of the embodiments, and are not described herein again.

Figure 9:
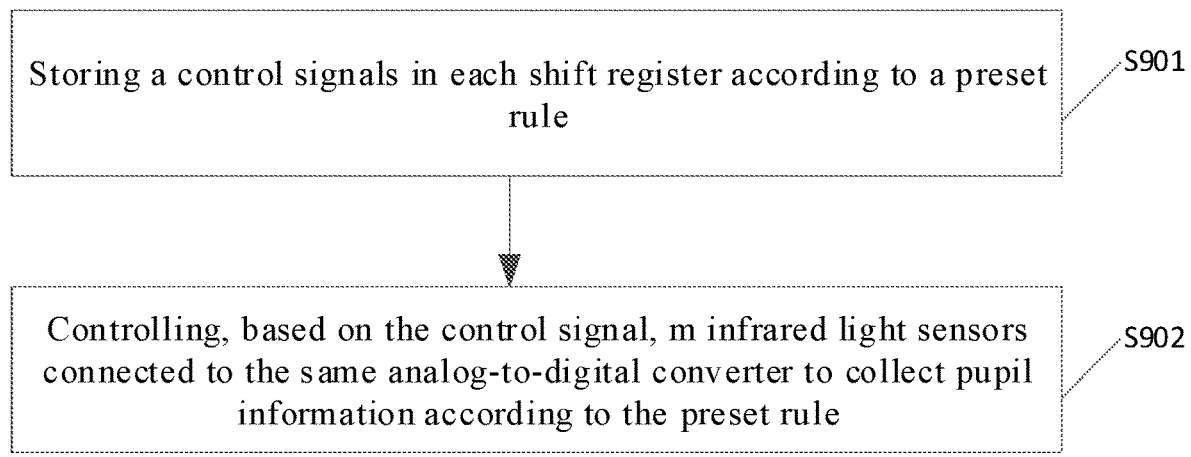
FIG. 9 is a schematic flowchart of a pupil information collection method according to an embodiment of the present disclosure.

In a third aspect, an embodiment of the present disclosure provides a pupil information collection method, which may be applied to the pupil information collection circuit as provided in any one of the above embodiments. FIG. 9 is a schematic flowchart of a pupil information collection method according to an embodiment of the present disclosure. As shown in FIG. 9, the pupil information collection method includes the following steps S901 and S902.

At S901, storing a control signal in each shift register according to a preset rule.

At S902, controlling, based on the control signal, the m infrared light sensors connected to the same analog-to-digital converter to collect the pupil information according to the preset rule.

In the pupil information collection method provided by the embodiment of the present disclosure, every m infrared light sensors may multiplex the same analog-to-digital converter, and the control signals are adjusted through the shift registers and the multiplexing sub-circuits, so as to realize the multiplexing of the signal channel. Therefore, the number of the analog-to-digital converters in the pupil information collection circuit can be reduced, and the area occupied by the analog-to-digital converters can be reduced.

In some implementations, the step S902 may specifically include: sequentially scanning the m infrared light sensors according to the control signal; if one of the m infrared light sensors collects the pupil information, turning off the rest m−1 infrared light sensors, and collecting the pupil information by using the one infrared light sensor only.

At any moment, only one infrared light sensor can be controlled to collect the pupil information of the user, the corresponding multiplexing sub-circuit can control the signal transmission between the infrared light sensor and the corresponding analog-to-digital converter, and other infrared light sensors are in the off state. In this way, the centralized collection for the pupil information can be realized, and the energy consumption for collecting the pupil information can be reduced while the efficiency for collecting the pupil information is ensured.

It should be understood that the above embodiments are merely exemplary embodiments adopted to explain the principles of the present disclosure, and the present disclosure is not limited thereto. It will be apparent to one of ordinary skill in the art that various changes and modifications may be made without departing from the spirit and scope of the present disclosure, and such changes and modifications also fall within the scope of the present disclosure.

What is claimed is:

1. A pupil information collection circuit, comprising: M infrared light sensors, N analog-to-digital converters and N multiplexing sub-circuits; where M and N are both positive integers, and M is greater than N;

wherein every m infrared light sensors are connected to the same analog-to-digital converter through one corresponding multiplexing sub-circuit; where m is less than or equal to M; and for the m infrared light sensors connected to the same analog-to-digital converter, a distance between collection ranges of any two adjacent infrared light sensors is greater than a diameter of the pupil, wherein each multiplexing sub-circuit comprises: shift registers and a data selector;

each shift register is connected to a control signal terminal and the data selector, and is configured to store a control signal for the corresponding analog-to-digital converter; and the data selector is configured to control, based on the control signal, the m infrared light sensors connected to the same analog-to-digital converter to collect the pupil information according to a preset rule.

2. The pupil information collection circuit of claim 1, wherein the data selector comprises: an encoder, and one first information channel and m second information channels connected to the encoder;

the first information channel comprises: a first transistor and a second transistor; a control electrode of the first transistor is connected to a signal output terminal of the encoder, a first electrode of the first transistor is connected to a first clock signal terminal, and a second electrode of the first transistor is connected to a control electrode of the second transistor; the control electrode of the second transistor is connected to the second electrode of the first transistor, a first electrode of the second transistor is connected to the analog-to-digital converter, and a second electrode of the second transistor is connected to the m infrared light sensors; and each second information channel comprises: a third transistor and a fourth transistor; a control electrode of the third transistor is connected to a signal output terminal of the encoder, a first electrode of the third transistor is connected to a second clock signal terminal, and a second electrode of the third transistor is connected to a control electrode of the fourth transistor; the control electrode of the fourth transistor is connected to the second electrode of the third transistor, a first electrode of the fourth transistor is connected to the analog-to-digital converter, and a second electrode of the fourth transistor is connected to one corresponding infrared light sensor.

3. The pupil information collection circuit of claim 2, wherein each multiplexing sub-circuit further comprises: m−1 data delayers; and each data delayer is configured to sequentially input scanning signals to the corresponding m infrared light sensors according to a preset rule.

4. The pupil information collection circuit of claim 3, wherein each data delayer comprises: a fifth transistor, a sixth transistor, a seventh transistor, a first capacitor, a second capacitor and a resistor; a polarity of the fifth transistor is opposite to that of the sixth transistor, and is the same as that of the seventh transistor;
- a control electrode of the fifth transistor is connected to the second clock signal terminal, a first electrode of the fifth transistor is connected to the second electrode of the corresponding fourth transistor, and a second electrode of the fifth transistor is connected to a terminal of the first capacitor;
- another terminal of the first capacitor is connected to a first electrode of the sixth transistor;
- a control electrode of the sixth transistor is connected to the second clock signal terminal, and a second electrode of the sixth transistor is connected to a terminal of the second capacitor and a first electrode of the seventh transistor;
- another terminal of the second capacitor is grounded;
- a control electrode of the seventh transistor is connected to the second clock signal terminal, the first electrode of the seventh transistor is connected to the second electrode of the sixth transistor, and a second electrode of the seventh transistor is connected to a terminal of the resistor and one corresponding infrared light sensor; and
- another terminal of the resistor is grounded.

5. The pupil information collection circuit of claim 1, wherein the data selector comprises: an encoder, and m second information channels connected to the encoder; and
- each second information channel comprises: a third transistor and a fourth transistor; a control electrode of the third transistor is connected to a signal output terminal of the encoder, a first electrode of the third transistor is connected to a second clock signal terminal, and a second electrode of the third transistor is connected to a control electrode of the fourth transistor; the control electrode of the fourth transistor is connected to the second electrode of the third transistor, a first electrode of the fourth transistor is connected to the analog-to-digital converter, and a second electrode of the fourth transistor is connected to one corresponding infrared light sensor.

6. The pupil information collection circuit of claim 1, wherein each infrared light sensor comprises: an infrared photodiode.

7. The pupil information collection circuit of claim 1, wherein each analog-to-digital converter is a one-bit analog-to-digital converter.

8. A display apparatus, comprising the pupil information collection circuit of claim 1.

9. The display apparatus of claim 8, further comprising: a display panel; wherein the display panel comprises a central display region and a peripheral display region surrounding the central display region; and
- the pupil information collection circuit is in the central display region or the peripheral display region.

10. The display apparatus of claim 8, wherein the display apparatus is a virtual reality display apparatus or an augmented reality display apparatus.

11. A pupil information collection method, applied to the pupil information collection circuit of claim 1, comprising:
- storing a control signal in each shift register according to a preset rule; and
- controlling, based on the control signal, m infrared light sensors connected to the same analog-to-digital converter to collect pupil information according to the preset rule.

12. The pupil information collection method of claim 11, wherein the controlling, based on the control signal, m infrared light sensors connected to the same analog-to-digital converter to collect pupil information according to the preset rule, comprises:
- sequentially scanning the m infrared light sensors based on the control signal; and
- in response to one of the m infrared light sensors collects the pupil information, turning off the rest m−1 infrared light sensors, and collecting the pupil information by using the one infrared light sensor only.

* * * * *